United States Patent
Chuah

(10) Patent No.: US 6,487,689 B1
(45) Date of Patent: Nov. 26, 2002

(54) RECEIVER INITIATED RECOVERY ALGORITHM (RIRA) FOR THE LAYER 2 TUNNELING PROTOCOL (L2TP)

(75) Inventor: Mooi Choo Chuah, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/350,431

(22) Filed: Jul. 8, 1999

(51) Int. Cl.$^7$ .............................. G08C 25/02; H04L 1/18
(52) U.S. Cl. ...................... 714/748; 370/236; 370/394; 370/466
(58) Field of Search .................... 714/746, 748, 714/749; 370/394, 466, 235, 236

(56) References Cited

U.S. PATENT DOCUMENTS

| | | | | |
|---|---|---|---|---|
| 5,963,551 A | * | 10/1999 | Minko | 370/356 |
| 6,094,437 A | * | 7/2000 | Loehndorf et al. | 370/420 |
| 6,141,785 A | * | 10/2000 | Hur et al. | 714/748 |
| 6,301,249 B1 | * | 10/2001 | Mansfield et al. | 370/394 |
| 6,378,099 B1 | * | 4/2002 | Rowitch | 714/748 |

OTHER PUBLICATIONS

K. Hamzeh, A. Valencia, A. Rubens, T. Kolar, W. M. Townsley, J. Taarud, G S. Pall, B. Palter, and W. Verthein, "Layer Two Tunneling Protocol (L2TP)", Internet Draft draft–ietf–pppext–12tp–12.txt, Oct. 1998.

* cited by examiner

*Primary Examiner*—Albert Decady
*Assistant Examiner*—Matt Dooley

(57) ABSTRACT

A Layer 2 Tunneling Protocol (L2TP) receiver performs a receiver initiated recovery algorithm (RIRA) when the number of lost or out-of-order payload packets exceed a predetermined value. In particular, the receiver maintains a number of variables: the "next sequence number expected to be received" (Sr) value, and Snl, which stores the value of the currently received "next sent" (Ns) sequence number from the latest received packet. When the value of Snl>Sr+ adjustment, the receiver portion resets the value of Sr to the value of Snl and passes all packets to the upper layer of the protocol stack. The value of the adjustment variable represents the number of packets that may be dropped or out-of-order at the receiver before the receiver initiates recovery. The receiver also sends (either via piggybacking or a zero-length message) an ACK packet to inform the sender of the new Sr value at the receiver.

10 Claims, 7 Drawing Sheets

US 6,487,689 B1

RECEIVER INITIATED RECOVERY ALGORITHM (RIRA) FOR THE LAYER 2 TUNNELING PROTOCOL (L2TP)

CROSS-REFERENCE TO RELATED APPLICATIONS

Related subject matter is disclosed in the co-pending, commonly assigned, U.S. Patent application of Chuah, entitled "A Sender Initiated Recovery Algorithm (SIRA) for the Layer 2 Tunneling Protocol (L2TP )," application Ser. No. 09/350,431 filed on Jul. 8, 1999.

BACKGROUND OF THE INVENTION

(1) Field of the Invention

This invention relates generally to communications and, more particularly, to packet communications systems.

(2) Background Art

The Layer Two Tunneling Protocol (L2TP ) (e.g., see K. Hamzeh, T. Kolar, M. Littlewood, G. Singh Pall, J. Taarud, A. J. Valencia, W. Verthein, W. M. Townsley, B. Palter, A. Rubens "Layer Two Tunneling Protocol (L2TP)", Internet draft, March, 1998) is designed by the Internet Engineering Task Force (IETF) L2TP Working Group to allow internet service providers (ISP) to offer services other than traditional registered Internet Protocol (IP) address-based services. For example, ISPs can now offer virtual dial-up services to their customers via L2TP tunnels (or L2TP connections) allowing them to access corporate intranets.

There are two types of sessions, in an L2TP connection, namely a control session and a data session. For a control session, L2TP defines a retransmission scheme for control messages (also known as control packets) lost during transmission. However, L2TP does not retransmit lost payload messages (also known as payload packets) for a data session. Instead, when payload packets are missing, L2TP defines a sender-initiated recovery algorithm (SIRA) for resetting the "next received" (Nr) sequence number at the receiver. In particular, when the transmit window times-out (i.e., the sender has transmitted a predefined number of packets without receiving an acknowledgement of a earlier-sent packet) the sender transmits a payload message that includes a predefined "Reset Sr" (R-bit) indicator, which resets the value for Nr (at the receiver) to either just beyond the first missing packet or to the current send sequence number of the sender.

SUMMARY OF THE INVENTION

In accordance with the invention, a Layer 2 Tunneling Protocol (L2TP ) receiver receives packets from an L2TP sender and initiates a recovery process upon detection of a predefined number of lost payload packets.

In an embodiment of the invention, an L2TP connection is established between two packet interfaces, i.e., an L2TP Access Concentrator (LAC) and a L2TP Network Server (LNS). The receiver of at least one of these packet interfaces performs a receiver initiated recovery algorithm (RIRA) when the number of lost or out-of-order payload packets exceeds a predetermined value. In particular, the receiver maintains a number of variables: the "next sequence number expected to be received" (Sr) value, and, in accordance with the invention, Snl, which stores the value of the currently received "next sent" (Ns) sequence number from the latest received packet. When the value of Snl>Sr+ adjustment, the receiver portion resets the value of Sr to the value of Snl and passes all packets to the upper layer of the protocol stack. The value of the adjustment variable represents the number of packets that may be dropped or out-of-order at the receiver before the receiver initiates recovery. The receiver also sends (either via piggybacking or a zero-length message) an acknowledgement (ACK) packet to inform the sender of the new Sr value at the receiver.

DETAILED DESCRIPTION

Figure 1:
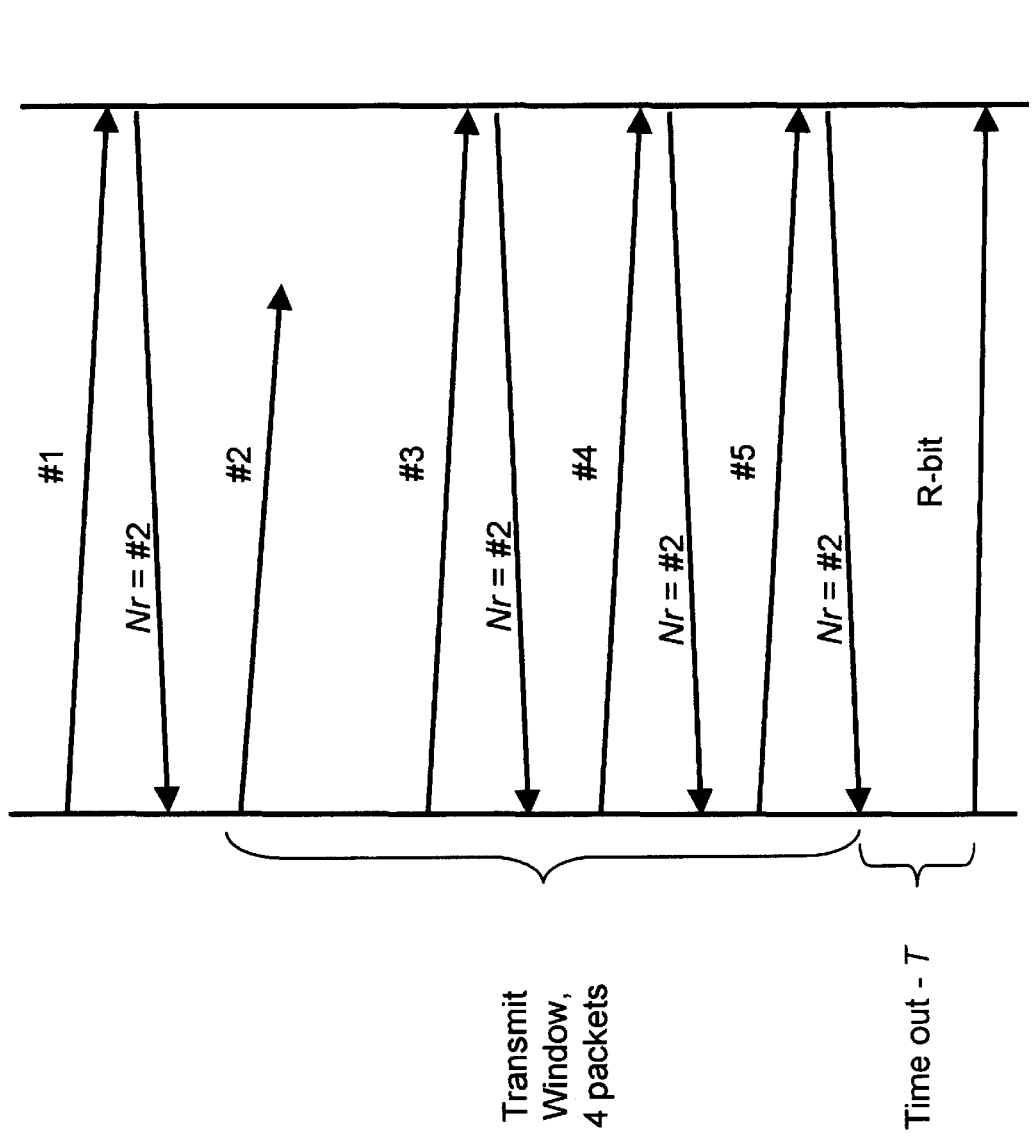
FIG. 1 shows an L2TP prior art transmission sequence.

At this point, before describing the inventive concept, a brief review is provided of L2TP sequence numbers. If the reader if familiar with this background, simply skip-ahead to the section entitled "Receiver Initiated Recovery Algorithm (RIRA)."

L2TP Sequence Numbers

In L2TP, each peer maintains a number of sequence number states. A single sequence number state is maintained for all control messages, and a session-specific sequence number state is maintained for the payload of each user session within a tunnel, For example, assume an L2TP Access Concentrator (LAC) has established an L2TP tunnel with an L2TP Network Server (LNS) such that the L2TP tunnel conveys two user sessions. The LAC then maintains one sequence number state for control messages to the LNS and two session-specific sequence number states, one for each user session. Similarly, the LNS also maintains its own sequence number state for control messages and two session-specific sequence number states. Further, the sender and receiver negotiate a transmit window size (in packets) that represents the number of packets the sender may transmit before requiring an acknowledgement from the receiver for an earlier transmitted packet (described further below).

A sequence number state is represented by distinct pair of state variables, Sr and Ss. Sr represents the expected sequence value of the next message from a peer. Ss represents the sequence value of the Ns field (described below) for the next message to be sent to the opposite peer. Each state, Sr and Ss, is initialized such that the first message sent and the first message expected to be received for each session has an Ns value of 0. This corresponds to initializing Ss and Sr in both peers to 0 for each new session.

In L2TP, there are two fields for use in a packet: the Nr (Next Received) field and Ns (Next Sent) field. These two fields are always present in control messages, and are optionally present in payload packets. Every time a peer sends a non-zero length message, it increments its corresponding Ss value for that session by 1. This increment takes place after the current Ss value is copied to Ns in the message to be sent. Outgoing messages always include the current value of Sr for the corresponding session in their Nr field (however, if sent before any packet is received, Nr is 0). When a non zero-length message is received with an Ns value that matches the session's current Sr value, Sr is incremented by 1. It should be noted that, for both control and payload sessions, Sr is not modified if a message is received with a value of Ns greater than the current Sr value.

Upon receipt of an in-order non-zero-length message, the receiving peer must acknowledge the message by sending back the updated value of Sr in the Nr field of the next outgoing message. This updated Sr value can be piggybacked in the Nr field of any non-zero-length outgoing messages that the peer may happen to send back.

A message (control or payload) with a zero-length body indicates that the packet is only used to communicate Nr and Ns fields. The Nr and Ns fields are filled in as described above, but the sequence number state, Ss, is not incremented. Thus, a zero-length message sent after a non-zero-length message contain a new Ns value while a non-zero-length message sent after a zero-length message contains the same value of Ns as the preceding zero-length message.

If the peer does not have a message to transmit after receiving a non-zero-length message, then it should send a zero-length message containing the latest values of Sr and Ss, as described above upon expiration of a timeout. The suggested value for this timeout is ¼ of the round trip time (RTT), if computed by the receiving peer, or a maximum of ½ second otherwise. This timeout should provide a reasonable opportunity for the receiving peer to obtain a payload message destined for its peer, upon which the ACK of the received message can be piggybacked. (This timeout value should be treated as a suggested maximum. To provide better throughput, the receiving peer should skip this timeout entirely and send a zero-length message immediately in the case where its receive window fills and it has no queued data to send for this connection or it can't send queued data because the transmit window is closed.)

Upon expiration of the timeout, Sr is compared to Lr (the last sent Nr) and if they are not equal, a zero-length ACK is issued. If they are equal, then no ACKs are outstanding and no action needs to be taken. The timer should not be reinitialized if a new message is received while it is active since such messages will be acknowledged when the timeout expires. This ensures that periodic ACKs are issued with a maximum period equal to the recommended timeout interval. This interval should be short enough to not cause false acknowledgement timeouts at the transmitter when payload messages are being sent in one direction only. Since such ACKs are being sent on what would otherwise be an idle data path, their affect on performance should be small, if not negligible.

For a control session, if outgoing messages are lost, retransmission of outgoing messages should eventually provide the receiving peer with the expected message. For payload sessions, however, lost messages are never retransmitted.

When a sent message is lost, the Sr value at the receiving peer sticks at the Ns value of the first missing payload message. In L2TP, a Sender Initiated Recovery Algorithm (SIRA) is defined and illustrated in FIG. 1. In SRA, the sender uses a timer mechanism to determine when transmitted payload packets have been lost. This timer mechanism uses the above-mentioned transmit window (and is also referred to as a form of "window time-out") and a predefined time-out value T. With respect to FIG. 1, it is assumed that the window size is 4 packets. Initially, the L2TP sender transmits a packet #1 (i.e., representative of a sequence number 1) to an L2TP receiver. Upon receipt, the L2TP receiver responds by sending a packet that includes an Nr value of #2 as the value of the next in-sequence packet the receiver expects to receive. The L2TP sender then transmits a packet #2. However, as shown in FIG. 1, this packet is not received by the L2TP receiver. Subsequently, the L2TP sender transmits packet #3, to which the L2TP receiver responds with a packet that includes an Nr value of #2. As such, the L2TP sender has not yet received an acknowledgement that packet #2 was received by the LT2P receiver. As is illustrated in FIG. 1, eventually, the L2TP sender transmits 4 packets (#2, #3, #4, and #5) without receiving an acknowledgement of packet #2. As such, the window size of 4 packets has been reached without receiving a packet acknowledgement (i.e., a window time-out occurs) and the L2TP sender halts transmission for a period of time T. If no acknowledgement is received before the period of time T expires, the L2TP sender transmits a payload message that includes a predefined "Reset Sr" (R-bit) indicator. Upon detection by the receiving peer of the R-bit indicator, the receiving peer updates its Sr value to the value of Ns contained in the received payload message (that included the R-bit indicator) if Ns>Sr. In other words, the R-bit indicator is used to reset the Sr value to the value of Ns. The sender can determine whether it wants to reset the Sr value of the receiver to one past the first missing payload message or to the current value of Ss as the sender. Unless the R-bit is set, a peer receiving a zero-length message does not update its Sr variable.

Receiver Initiated Recovery Algorithm (RIRA)

In accordance with the invention, a layer 2 tunneling protocol (L2TP) receiver receives packets from an L2TP sender and initiates a recovery process upon detection of a predefined number of lost payload packets.

Figure 2:
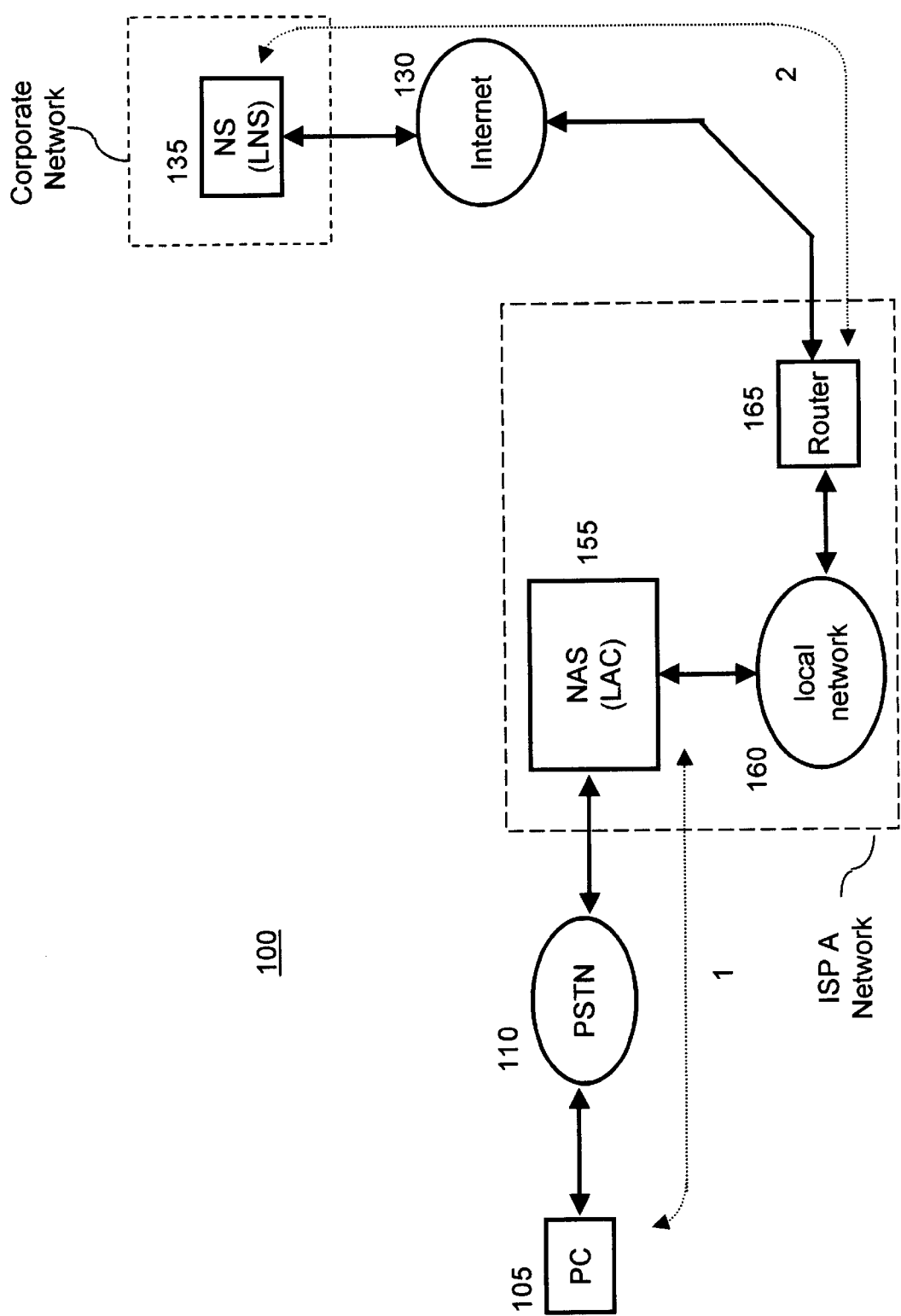
FIG. 2 shows a communications system in accordance with the principles of the invention.

FIG. 2 shows an illustrative communications system 100 in accordance with the principles of the invention. Other than the inventive concept, the elements are well-known and will not be described in detail. For example, personal computer (PC) 105 includes data communications equipment (not shown) for dial-up access through public-switched-network (PSTN) 110 to ISP A for establishing an Internet connection. Likewise, the solid lines between elements of communications system 100 are representative of well-known communications facilities between the respective endpoints, e.g., the connection between PC 105 and PSTN 110 is representative of a local loop connection, the connection between ISP A and Internet 130 is supported by asynchronous transfer mode (ATM) over a synchronous optical network (SONET), etc.

As can be observed from FIG. 2, communications system 100 further comprises ISP A, as represented by ISP A Network. The latter comprises network access server (NAS) 155 (also referred to herein as an L2TP Access Concentrator (LAC)), which includes a point-of-presence (POP) router (not shown) as known in the art, a local network 160, and a router 165. It is assumed that ISP A provides a virtual private network (VPN) service for remotely located employees (associated with PC 105) to access an illustrative Corporate Network via network server (NS) 135 (also referred to herein as an L2TP Network Server (LNS)), which provides, among other functions, a routing and firewall capability. (The Corporate network is assumed to be, e.g., a collection of local area networks (not shown) suitably protected behind the LNS.) For the purposes of this description, it is assumed that the reader is familiar with the above-mentioned L2TP protocol.

Figure 3:
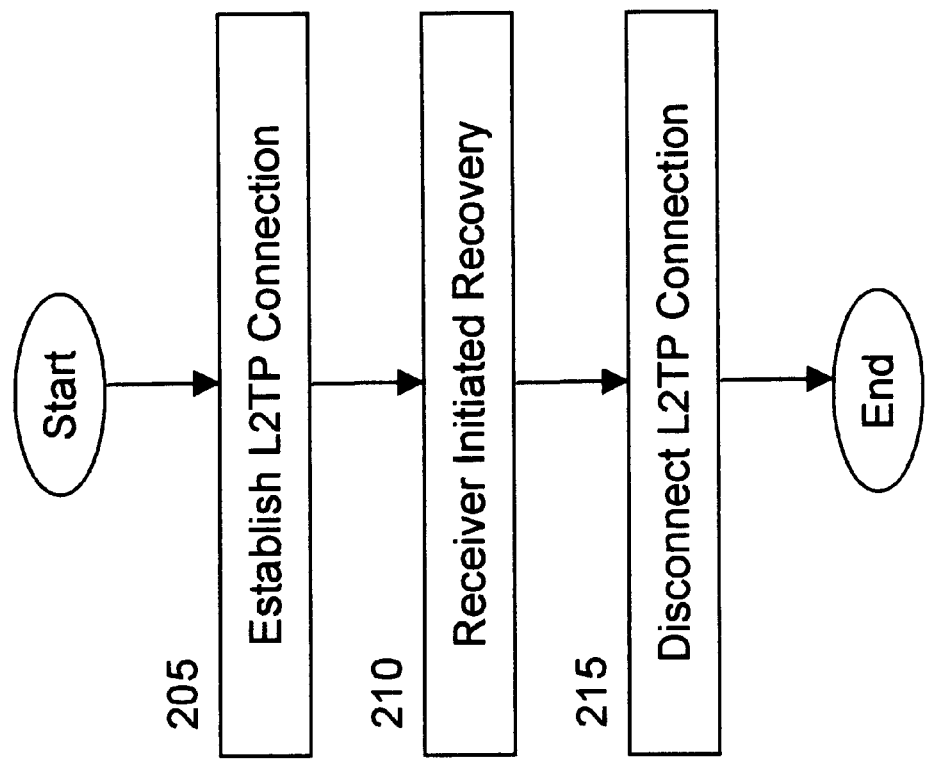
FIGS. 3 and 4 show illustrative flow charts of methods in accordance with the principles of the invention.

Reference should also be made at this time to FIG. 3, which shows an illustrative flow chart of a method in accordance with the principles of the invention. For the purposes of this description, the inventive concept is described in the context of an illustrative packet interface, e.g., the LAC, in the context of receiving packets for transmission to PC 105. However, it should be understood that the inventive concept is not so limited and equally applies to any packet interface that receives packets, such as the LNS. (It is presumed that the LAC and the other respective servers are suitably programmed to carry out the below-described methods using conventional programming techniques, which, as such, will not be described herein.)

In step 205, the LAC establishes an L2TP connection 2 with the LNS for communicating data between PC 105 and the LNS, which provides a gateway to the corporate network (not shown in detail). As known in the art, step 205, either results in the creation of a new tunnel to support the call between the user (not shown) associated with PC 105 and the LNS, or simply adds an L2TP connection to an existing L2TP tunnel. (Although not described herein, it is assumed that there is a point-to-point (PPP) connection 1 between the LAC and PC 105. That is, payload packets over L2TP connection 2 are L2TP encapsulated PPP packets for user sessions between the LAC/LNS pair.)

As noted above, there are two types of L2TP sessions in an L2TP connection, a control session and a payload session. (It should also be noted that the term control connection and payload connection may also be used, respectively.) In accordance with the invention, in step 210, after establishing an L2TP connection, an L2TP receiver (here, illustrated by the LAC) initiates a receiver initiated recovery algorithm (RIRA) upon detection that the number of lost or out-of-order payload packets exceed a predetermined value (described below). The LAC continues to perform the RIRA if necessary until the L2TP connection is disconnected in step 215.

Figure 4:
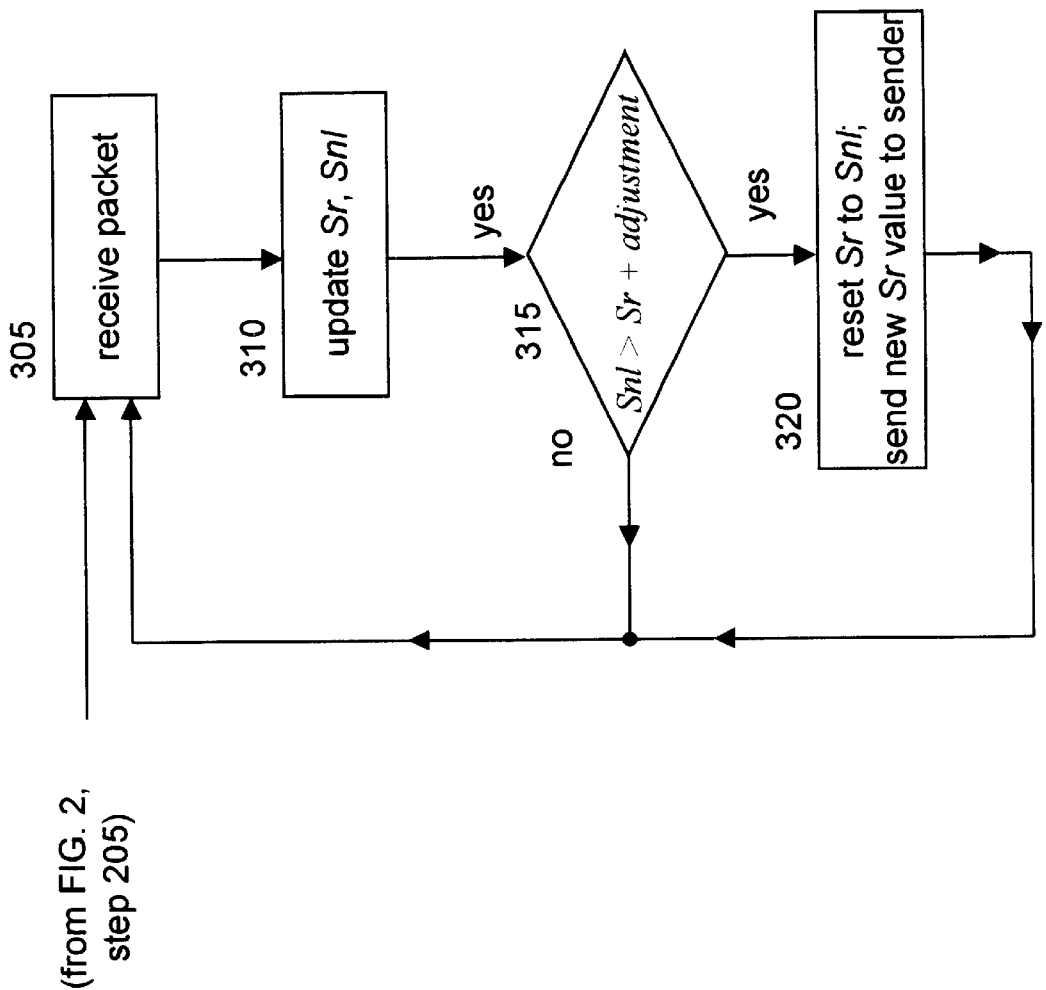

Turning now to FIG. 4, another flow chart is shown further illustrating the RIRA of step 210. It should be noted that, other than the inventive concept, the LAC maintains and updates the above-described sequence number state as in the prior art. In step 305, the LAC receives a packet. In step 310, the LAC updates the above-described sequence number state and, in accordance with the invention, also maintains a variable, Snl, which stores the value of the currently received "next sent" (Ns) sequence number value in the latest received packet. In accordance with the invention, the LAC executes step 315. If, the value of Snl is not greater than (Sr+adjustmnent), then the LAC continues to receive packets in step 305. However, if in step 315, the value of Snl is greater than (Sr+adjustment), then the LAC resets the value of Sr to the value of Snl and passes all packets to the upper layer of the protocol stack (not shown). (It is assumed that the receiver keeps out-of-order packets in a queue (not shown). However, if packets are received in order they are passed to the upper layers of the protocol stack (not shown) for further processing.)

The value of the adjustment variable represents the number of packets that may be dropped or out-of-order at the receiver before the receiver initiates recovery. The value of the adjustment value is determined empirically. For the purposes of this example, it is assumed that the value of the adjustment variable is equal to 3 packets. In addition, in step 320, the LAC sends (either via piggybacking or a zero-length message) an acknowledgement (ACK) packet to inform the sender (here, the LNS) of the new Sr value at the receiver.

Figure 5:
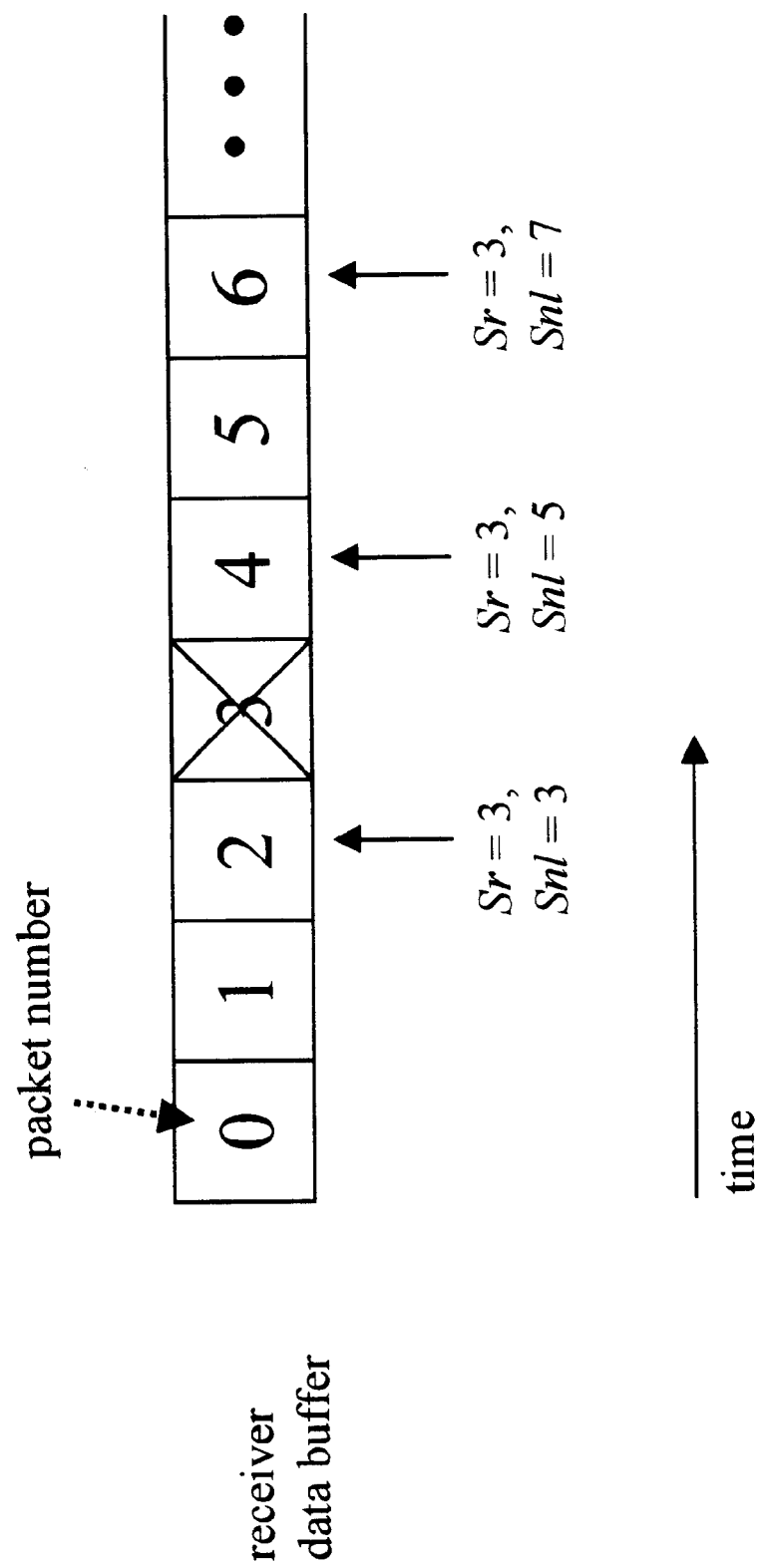
FIG. 5 shows an illustrative received packet sequence.

An illustrative received packet sequence is shown in FIG. 5. The sequence of boxes represents associated receive data buffers (not shown) in the LAC for each received packet. Using the illustrative method described above, when packet number 2 is received, the LAC updates the Sr and Snl values to 3. However, packet number 3 is not received (indicated by the x-mark through the box). As such, when packet number 4 is received the Sr value remains at 3 while the Snl value is incremented to 5 by the LAC. If this situation continues, i.e., packet number 3 is not received, when packet number 6 is received, the Snl value is greater than the value of Sr plus the adjustment value of 3 and, in accordance with the invention, Sr is reset to Snl.

It should be noted that, setting a window size to be two or three times the round trip times is sufficient to give relatively high throughput. In addition, the timeout interval can be chosen to be comparable to round trip time plus two or four standard deviations. Finally, it is still required that the sender transmits an R-bit packet when the window of the sender is closed for more than a window timeout value. Illustratively, a buffer (not shown) of size of 128 packets is assumed. However, buffer size only needs to be one more than the window size. An illustrative window size is 7 packets. An illustrative RTT is 4 packets.

Figure 6:
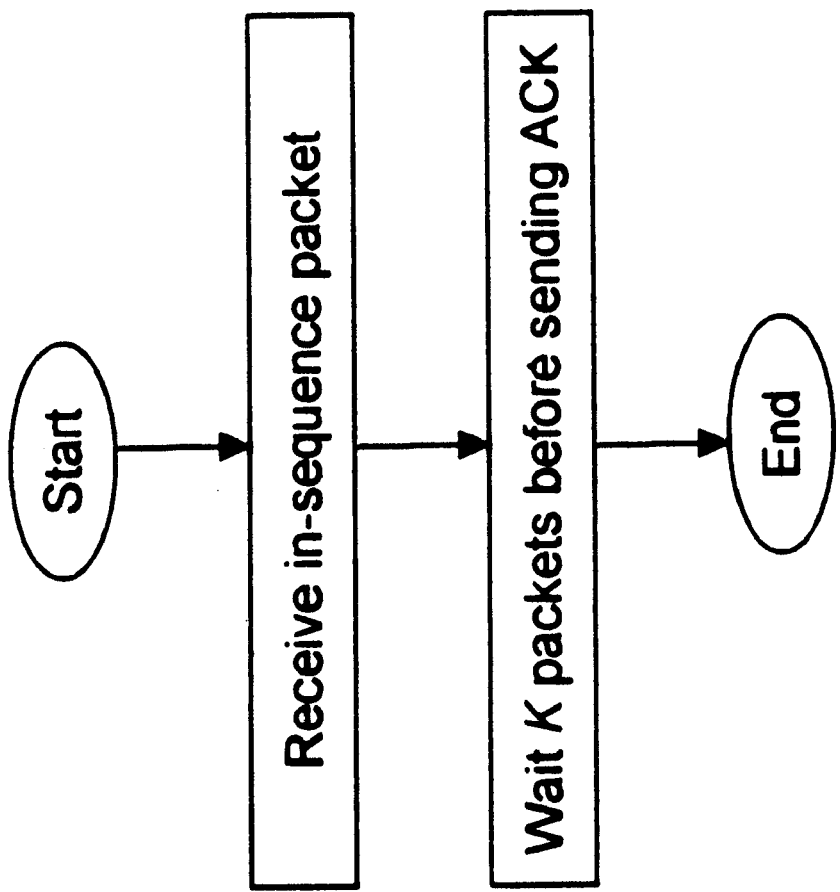
FIG. 6 shows an illustrative flow chart of a method in accordance with the principles of the invention.

In accordance with a feature of the invention, the receiver incorporates a "delayed feedback feature" in which the receiver sends delayed ACK packets. The delayed feedback feature provides some freedom in trading off performance between throughput, response time and overhead bandwidth consumption. In other words, the receiver has the freedom of not immediately ACKing an in-order received packet. The receiver can choose a certain feedback interval (denoted by the variable "feedback interval," or K) for sending such an ACK. For a feedback interval of one, the receiver always immediately acknowledges the in-order received packet. For a feedback interval of three, the receiver delays by three packets any ACK. A flow chart for the delayed feedback feature is shown in FIG. 6.

Figure 7:
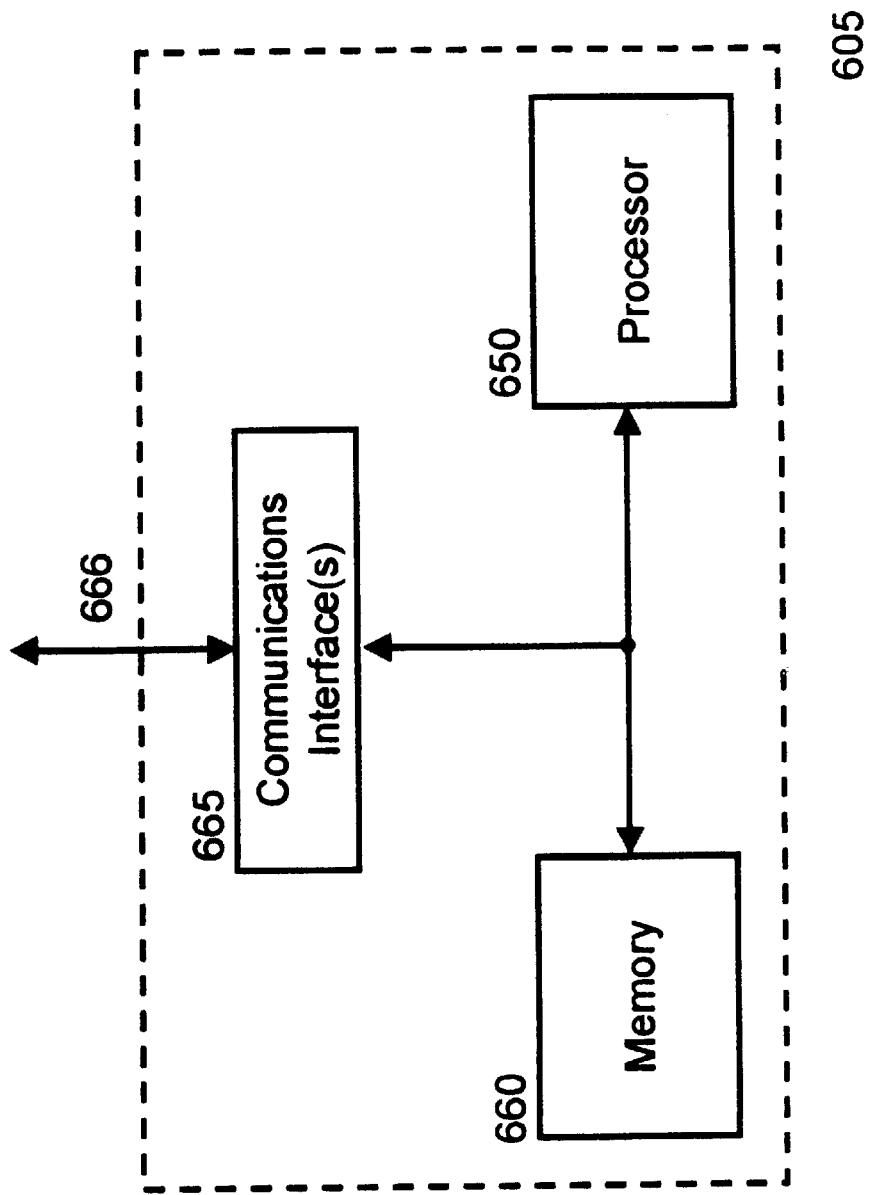
FIG. 7 shows a block diagram of an illustrative packet interface embodying the principles of the invention.

Turning briefly to FIG. 7, a high-level block diagram of a representative packet interface for use in performing RIRA in accordance with the principles of the invention is shown. Packet interface 605 is a stored-program-control based processor architecture and includes processor 650, memory 660 (for storing program instructions and data, e.g., for performing the illustrative methods shown in FIGS. 3, 4, and 6, etc.) and communications interface(s) 665 for coupling to one or more packet communication facilities as represented by path 666.

The foregoing merely illustrates the principles of the invention and it will thus be appreciated that those skilled in the art will be able to devise numerous alternative arrangements which, although not explicitly described herein, embody the principles of the invention and are within its spirit and scope.

What is claimed is:

1. A method for use in a layer 2 tunneling protocol (L2TP) receiver, the method comprising the steps of:

receiving packets from an L2TP sender;

causing the receiver to store an index value related to sent packets;

incrementing the stored index value for each received packet;

comparing a current stored index value with an L2TP expected-value parameter; and initiating a recovery process when the current stored index value exceeds the L2TP expected-value parameter by a predetermined threshold amount.

2. The method of claim 1 wherein the stored index value is represented as a currently received "next sent" sequence number (Snl) and the L2TP expected-value parameter is represented as a "next sequence number expected to be received" (Sr).

3. The method of claim 2 further comprising the step of resetting Sr to the currently received next sent sequence number value.

4. The method of claim 1 further comprising the step of detecting the loss of a predefined number of packets before initiating the recovery process step.

5. The method of claim 1 further comprising the step of waiting for K received packets before sending an acknowledgement of an earlier received packet to the L2TP sender, where K>1.

6. A packet interface for use in forming a layer 2 tunneling protocol (L2TP) receiver, the packet interface comprising:

a communications interface for receiving packets from an L2TP sender;

a storage means for storing an index value related to sent packets; and a processor for:

incrementing the stored index value for each received packet;

comparing a current stored index value with an L2TP expected-value parameter; and initiating a recovery process when the current stored index value exceeds the L2TP expected-value parameter by a predetermined threshold amount.

7. The packet interface of claim 6 wherein the processor waits for K received packets before sending an acknowledgement of an earlier received packet to the L2TP sender, where K>1.

8. A packet interface for use in forming a layer 2 tunneling protocol (L2TP) receiver, the packet interface comprising:

a communications interface for receiving packets from an L2TP sender;

a memory for storing (a) a currently received "next sent" sequence number value from a received packet (Snl); and (b) a value representing a "next sequence number expected to be received" (Sr); and a processor for incrementing the value of Snl for each received packet and initiating a receiver recovery process when a difference between a current Snl value and Sr exceeds a predefined threshold.

9. The packet interface of claim 8 wherein the processor resets Sr to the currently received next sent sequence number value when the difference between Snl and Sr exceeds the predefined value.

10. The packet interface of claim 8 wherein the processor waits for K received packets before sending an acknowledgement of an earlier received packet to the L2TP sender, where K>1.

* * * * *